L. S. MARSH.
AIRPLANE WING CONSTRUCTION.
APPLICATION FILED JAN. 12, 1921.
1,435,409.
Patented Nov. 14, 1922.
2 SHEETS—SHEET 1.
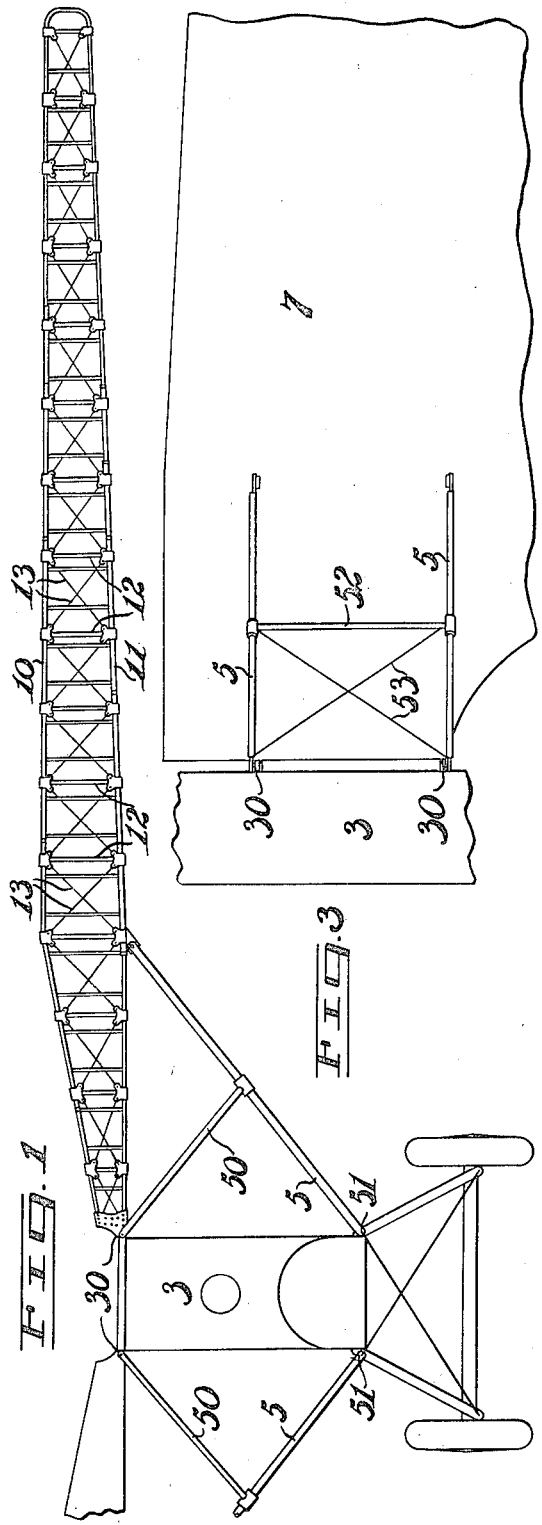
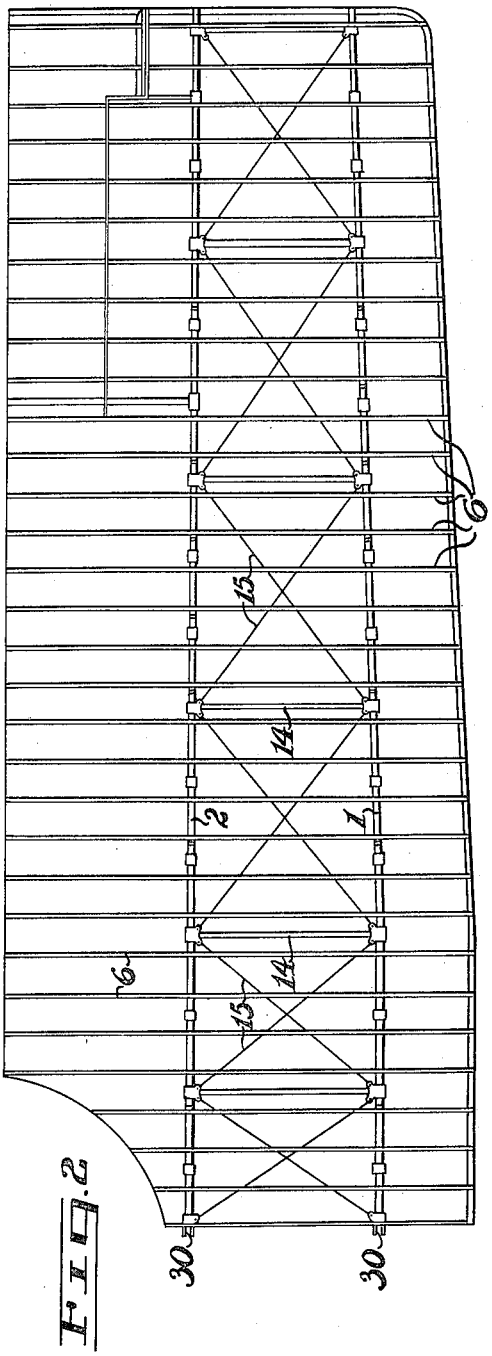
INVENTOR
*Louis S. Marsh*
BY
*H. L. & C. L. Reynolds*
ATTORNEYS

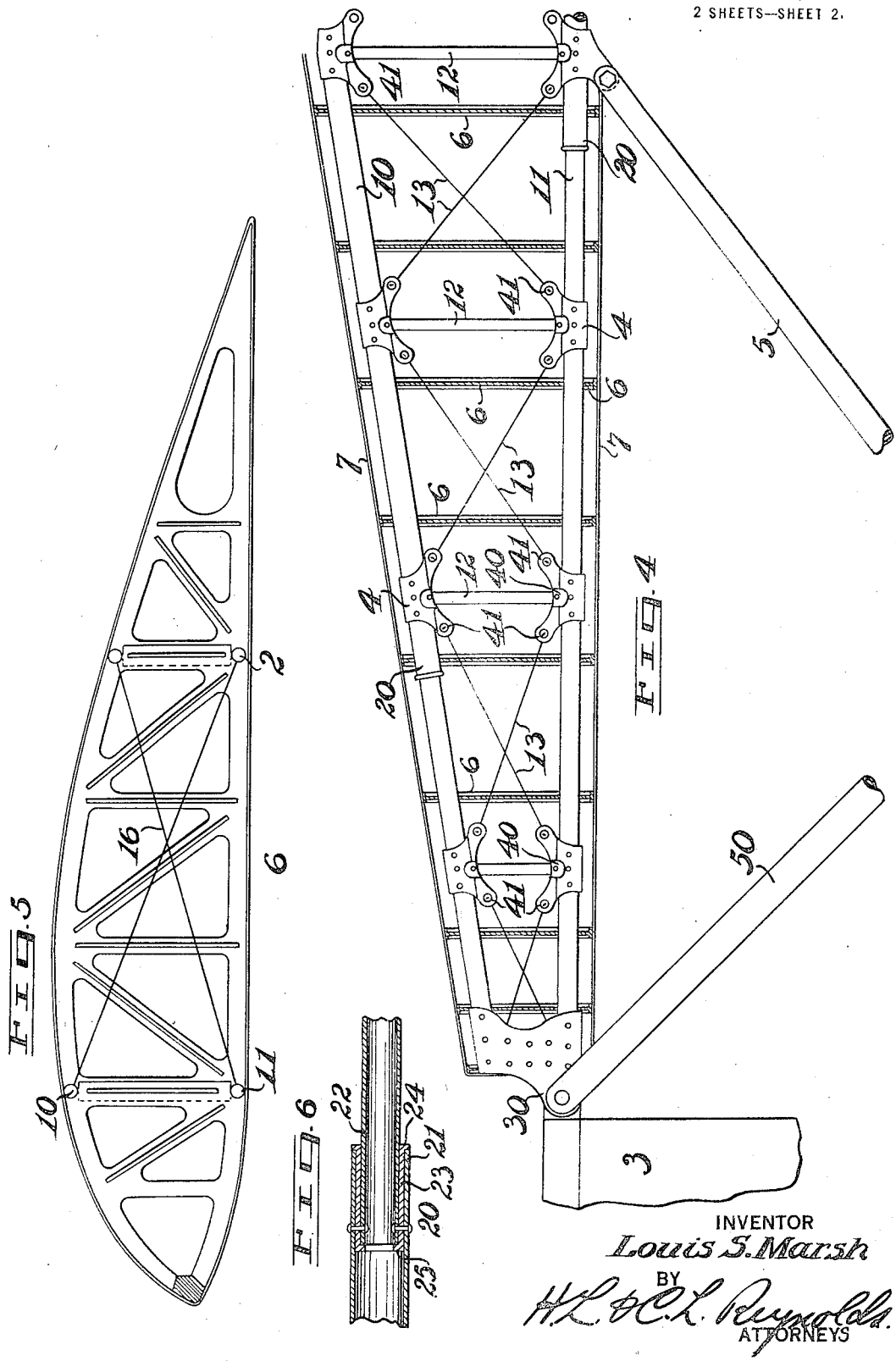

Patented Nov. 14, 1922.

1,435,409

UNITED STATES PATENT OFFICE.

LOUIS S. MARSH, OF KIRKLAND, WASHINGTON, ASSIGNOR TO BOEING AIRPLANE COMPANY, OF SEATTLE, WASHINGTON, A CORPORATION OF WASHINGTON.

AIRPLANE-WING CONSTRUCTION.

Application filed January 12, 1921. Serial No. 436,702.

*To all whom it may concern:*

Be it known that I, LOUIS S. MARSH, a citizen of the United States of America, and resident of the town of Kirkland, in the county of King and State of Washington, have invented certain new and useful Improvements in Airplane-Wing Constructions, of which the following is a specification.

My invention relates to airplanes and more particularly to the construction of the wings and the manner of securing them to the fuselage, wherein all truss and guy members are enclosed within the wing and not exposed to the air, to produce air resistance and thus retard the plane.

One object of my invention is to produce an airplane wing having its stiffening frame wholly enclosed within its outer skin and thus protected from air resistance, external braces and guys being done away with, except for a single strut and guy.

A further object is to so construct the wing and proportion its members as to make of it a true cantilever beam having its fulcrum point at a distance outward from the fuselage, this point being connected with the fuselage by a diagonal strut at a point separated a considerable vertical distance from the point where the inner end of the wing is connected to the fuselage, whereby the upward lift of the wing produces a compression thrust downward in the fuselage frame.

Another object is to so shape the wing at its inner end and to so secure this inner end to the fuselage, that the occupant's vision is as little obstructed by the wing as possible. Other objects will appear from a study of the description and claims.

The construction of an airplane wing illustrative of my invention will first be described and the features thereof which I believe to be new and which I desire to patent will then be particularly defined in the claims.

In the accompanying drawings I have illustrated a preferred construction which embodies my invention.

Fig. 1 is a fore-and-aft view of one wing and the fuselage of an airplane, the inner skeleton construction of the wing frame being shown, as would occur if the outer skin were removed or in section.

Figure 2 is a plan view of a wing framing of the same construction, the top skin or surface being removed.

Fig. 3 is a bottom plan of the inner end of such a wing showing the location of the sole exterior struts or bracing members employed.

Fig. 4 is an elevation of the inner end of the wing frame, the top and bottom skin being in section.

Fig. 5 is a transverse section of the wing structure at approximately its thickest point.

Fig. 6 is a detail of a joint construction.

In carrying out my invention I consider each wing as a beam and make it of a vertical thickness sufficient to accommodate entirely within itself, that is, between its upper and lower skin surfaces, all of the supporting or stiffening members, thus eliminating all exterior struts and tie rods which would act to retard motion and consume power.

This beam is also designed as a cantilever beam, or one having its principal point of support toward but at some distance from one end, whereby, in addition to the engineering and structural advantages obtained, this, the inner, end of the wing beam may be reduced to a relatively slight vertical thickness, thereby minimizing obscuration of the pilot's vision.

The longitudinal frame members consist of two or more trusses 1 and 2, which extend the entire length of the wing and are spaced apart in a fore-and-aft direction. Each of these trusses has an upper chord 10, lower chord 11, connecting struts or posts 12 and diagonal tie rods 13. The two trusses 1 and 2 are connected together by fore-and-aft struts or posts 14 and diagonal tie rods 15 and 16, located respectively in horizontal and vertical planes, thus making a trussed beam which is efficient in resisting strains acting in any and all directions.

The longitudinal chords 10 and 11 are made of tubular metal sections which differ in size in different parts of the length of the chord, the sizes being designed to conform to the stresses occurring at various points. Such differences are shown at two points in Figure 4, indicated at 20. Such joints when possible, are made by telescoping the tube sections of which the chords are made.

In Figure 6 is shown a preferred type of construction for such joints. As there illustrated, the larger pipe 21 is enough larger than the smaller section 22, to accommodate a sleeve 23 between them when telescoped. This sleeve has flanges 24 and 25 which engage respectively with the end of the pipe 21 and pipe 22. The parts may then be secured by welding, brazing, riveting or any other acceptable manner. In such a joint the reinforcing by the sleeve and its thrust bearing flanges makes a very strong joint which will not collapse.

At the points where the struts connect top and bottom chords of the vertical trusses and the front and rear chords of the horizontal trusses, encircling clips 4 are used, these being stamped up from metal plates. These are molded to form sockets 40 which closely embrace the ends of the connecting struts and are also provided with ears 41 for the attachment of the tie rods 13 and 15. These clips are secured to the truss chords in any acceptable manner, as by riveting.

The inner ends of the wings are tapered in their vertical thickness as is clearly shown in Figures 1 and 4, and the pilot is located so that his head is approximately level with the wing, so that his view is obstructed by the wing throughout only a small angle. As illustrated this tapering of the wing extends to about the point where the braces or struts 5 connect with the wing.

This is feasible because the wing frame is designed and constructed as a cantilever beam having its chief point of support where the strut 5 connects therewith. As this point is well inward from the center of its supporting area, a downward thrust is produced at the point where it connects with the fuselage.

Each of the vertical trusses 1 and 2, at the inner end of the wing, is provided with pivotal connection at 30 to the upper part of the fuselage. A diagonal bracing strut 5 is connected with the lower part of the fuselage at 51 and with each truss 1 and 2 at points outward from the fuselage at such a distance that the strut makes an angle of approximately 45° with the wing. A stiffening brace 50 connects the central part of each of the braces 5 with the top part of the fuselage. A transverse or fore-and-aft bar 52 connects the two braces 5 and diagonal tie rods 53 prevent side swaying.

Upon the truss structure so formed is placed a series of fore-and-aft ribs or formers, 6, of which one is shown in side view in Figure 5. These are built up in truss fashion, of ply-wood, metal, or any other suitable material, and are covered by the wing skin 7, which may be of fabric, ply-wood, metal or any other suitable material. This skin covering is supported solely by the ribs 6 and the latter by the truss structure.

In such a design the trussing of the wing is entirely within its body. The only exterior stiffening consists of the diagonal braces 5 and 50. The air resistance caused by the common braces and tie rods is thus eliminated.

The braces 5 may be crossed to form a letter X instead of being placed parallel as shown in Figure 3. This will permit elimination of the diagonal tie rods 53.

Such a construction of wing posseses ample strength and a minimum of air resistances. It also permits an enlarged angle of vision for the occupants.

What I claim as my invention is:

1. An airplane wing having a plurality of trussed beams occupying vertical planes and extending lengthwise of the wings and lying wholly inside of the top and bottom skin thereof, the inner ends of said wings being tapered in vertical thickness and pivotally connected with the upper edge of the fuselage and diagonally positioned struts connecting the lower edge of the fuselage with the wing at a point removed from the fuselage.

2. An airplane wing forming a selfcontained cantilever beam and connected by its inner end with the fuselage, a diagonal brace connecting the fuselage with the wing outward from the fuselage, the inner end of the wing being tapered in vertical thickness to reduce the angle of its screening effect upon the vision of the occupant.

3. An airplane wing forming a selfcontained cantilever beam and pivotally connected by its inner end with the upper part of the fuselage, a diagonal brace connecting the lower part of the fuselage with the wing outward from the fuselage, the inner end of the wing being reduced in vertical thickness from its point of connection with the diagonal brace to its point of connection with the fuselage.

Signed at Seattle, King County, Washington this 14th day of December 1910.

LOUIS S. MARSH.